UNITED STATES PATENT OFFICE.

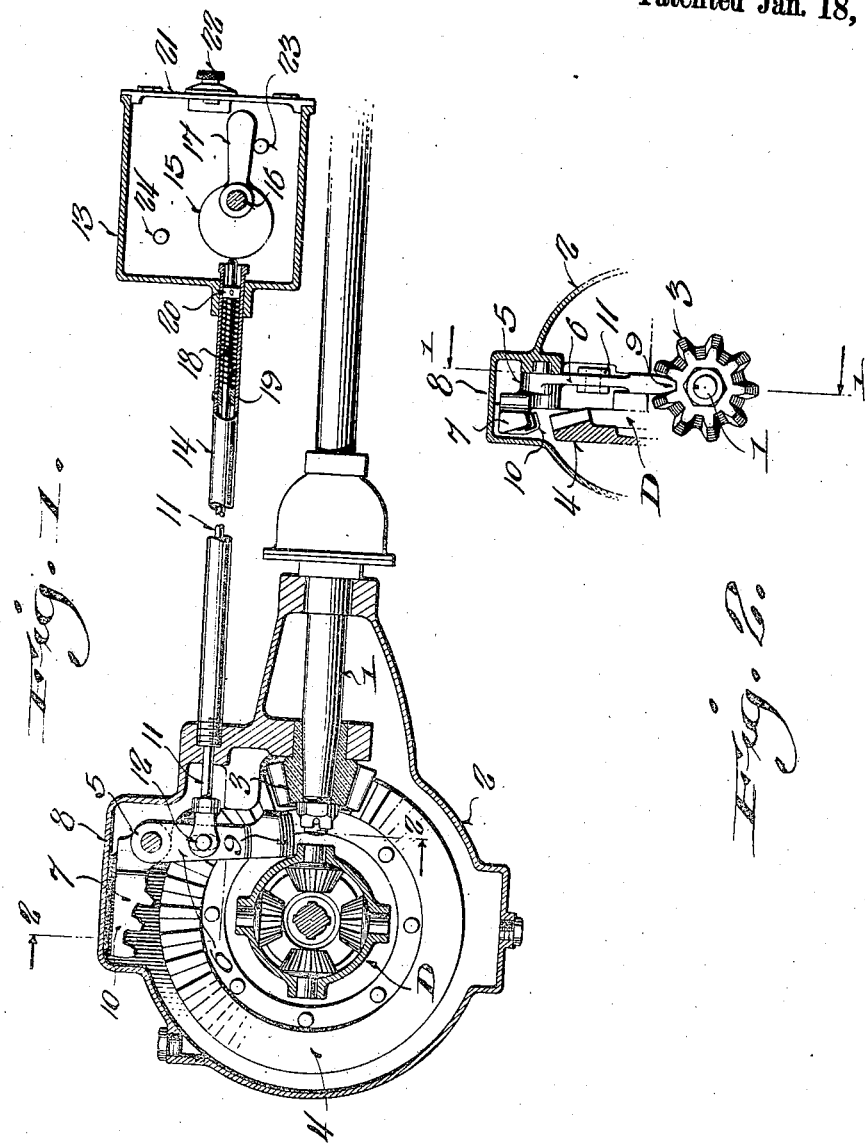

EDWIN E. MELLENTHIN, OF WAUKESHA, WISCONSIN.

AUTOMOBILE-LOCK.

1,365,841.

Specification of Letters Patent.   Patented Jan. 18, 1921.

Application filed May 18, 1920.   Serial No. 382,380.

*To all whom it may concern:*

Be it known that I, EDWIN E. MELLENTHIN, a citizen of the United States, and resident of Waukesha, in the county of Waukesha and State of Wisconsin, have invented certain new and useful Improvements in Automobile-Locks; and I do hereby declare that the following is a full, clear, and exact description thereof.

My invention relates to new and useful improvements in means for securing automobiles and similar motor vehicles against theft or unauthorized use.

One of the primary objects of my invention is to provide a locking means which can be easily and quickly manipulated by the driver to throw the same into or out of use.

Another important object of the invention is to provide an arrangement of this character which will effectively secure the main drive shaft against rotation.

Another such object is to lock the differential gears and consequently the vehicle driving wheels against movement.

With these general objects in view the invention consists in the novel features of construction, combination and arrangement of parts which will be hereinafter more particularly described and claimed and shown in the accompanying drawing, wherein:

Figure 1 represents a longitudinal sectional view through the drive means of a motor vehicle showing the application of my invention thereto, said section being taken substantially on the plane of the line 1—1 of Fig. 2.

Fig. 2 is a detail transverse section taken approximately on the plane of the line 2—2 of Fig. 1.

Referring more particularly to the illustrated embodiment of the invention, it will be noticed that the reference character 1 indicates an automotive vehicle drive shaft which has one end journaled in a portion of a differential housing 2 and provided with a main drive gear 3. This gear 3 is of the usual beveled toothed type and is secured upon the shaft 1 in any preferred manner. Obviously the shaft 1 extends to a suitable power plant carried by the vehicle of which the parts illustrated form elements.

In the differential housing 2 is located the usual differential D which, among other parts includes a main driven gear 4 having teeth which mesh with the teeth of the drive gear 3. As is customary the power of the vehicle power plant is transmitted through the drive shaft 1 and the differential D to the drive wheels. Therefore by locking the drive and driven gears, the vehicle will be safely secured against unauthorized use.

In carrying out the objects of the invention, the differential housing 2 is provided with a bell-crank 5, one arm 6 of which depends between the main driven gears 4 and extends toward the drive gear 3, the other arm 7 being normally located above said driven gears 4 in the usual domed portion 8 of the housing 2. The arm 6 is provided with a tooth 9 for engagement between the teeth of the gear 3, whereas the other arm 7 has a plurality of teeth 10 adapted to be disposed between the teeth of one of the main driven gears 4.

Extending forwardly of the differential housing 2 and having one end slidable through the front wall thereof, is an actuating rod 11. The differential housing end of this rod 11 is pivoted to the arm 6 of the bell-crank as indicated at 12, while the opposite end of the rod projects into an eccentric casing 13. As shown in Fig. 1 the intermediate portion of the rod is housed within a sleeve 14, the same being connected at its opposite ends to the differential housing 2 and eccentric casing 13. The latter is located in any convenient part of the vehicle, but preferably adjacent to the driver's seat so that the driver may have ready access thereto at any time for controlling the bell-crank actuating means disposed therein.

This actuating means consists of an eccentric 15 carried by shaft 16 and having an operating handle 17, and of an expansile spring 18. In practice the spring 18 will be located within the sleeve 14 and have one end engaged with a stationary collar 19 and its opposite end in contact with a rod carried collar 20. The casing 13 is provided with a cover or door 21 which is locked, preferably by means of a combination lock 22.

Normally the parts are positioned as shown in Fig. 1 in the drawing, and under such conditions the vehicle can be propelled in a usual manner. That is to say the teeth 9 and 10 of the arms 6 and 7 respectively are disengaged with the gear teeth, the bell-crank being secured in its inoperative position by the engagement of the high side of the eccentric 15 with the end of the actuated rod 11. When, however, the vehicle driver leaves his machine and desires to secure it against unauthorized use, he moves the eccentric handle 17 from engagement with the stop 23 into contact with the stop 24. This shifts the eccentric and permits the tension of the spring 18 to force the rod 11 inwardly of the casing 13 and outwardly of the differential housing 2. Consequently the bell-crank 5 rocks and the teeth 9 and 10 are respectively engaged with the teeth of the gear 3 and one of the gears 4, thus locking said gears against rotation.

Attention is directed to the fact that the bell-crank lever is particularly designed to operate in conjunction with a differential beveled gear and the beveled pinion of the drive shaft. The arm 7 of the bell-crank is provided with a plurality of teeth for locking engagement with the differential beveled gear and the end strain upon this arm develops side thrust against the pivot stud of the bell crank.

The other arm 6 of the bell-crank lever is arranged to swing in axial alinement with the drive shaft 1, said arm being provided with a single tooth only for rocking or sliding engagement with the beveled pinion 3, and said arm 6 can thus readily engage the teeth of the beveled pinion without liability of stripping, due to the sliding engagement. Strain upon the arm 6 of the bell-crank is sidewise, and hence, develops end thrust upon the bell-crank stud. Hence, it will be seen that the strain upon the bell-crank stud is in two directions, that is, the arm 7 develops side thrust thereupon and the arm 6 end thrust so as to distribute the load upon the stud bearing in two directions, whereby there is less liability of the parts to wear or break under certain load shock.

The hereinbefore referred to drawing merely illustrates one embodiment of the invention, and the foregoing description is an explanation of such embodiment, but is to be understood that I do not desire to be limited to this particular showing, and various changes may be made in the different parts and in the general association thereof without departing from the principles of the invention as outlined in the following claim.

I claim:

In a mechanically driven vehicle having a rear axle, a differential gear mechanism mounted thereon embodying a beveled gear wheel, a housing for the differential, a drive shaft extending into the housing, and a toothed gear pinion in meshed engagement with the beveled gear wheel of the differential; the combination of a locking mechanism comprising a bell-crank lever pivotally mounted within the housing, having one arm provided with a series of teeth tangentially engageable with the teeth of the differential beveled gear, while the other arm of the bell-crank lever is arranged to swing in axial alinement with the beveled pinion and having a single tooth for sliding engagement with the beveled pinion teeth, and incased with the beveled pinion teeth, and incased means at a distance from the differential mechanism for actuating the bell-crank lever.

In testimony that I claim the foregoing I have hereunto set my hand at Milwaukee, in the county of Milwaukee and State of Wisconsin.

EDWIN E. MELLENTHIN.